Aug. 13, 1929.  E. H. LUND  1,724,881
SAFETY CUT-OFF FOR PRESSURE LINES OF HYDRAULIC BRAKES
Filed Sept. 12, 1927  2 Sheets-Sheet 1
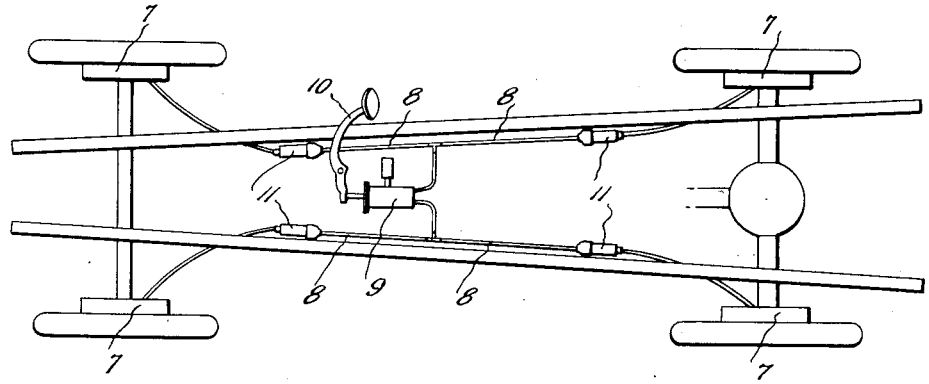
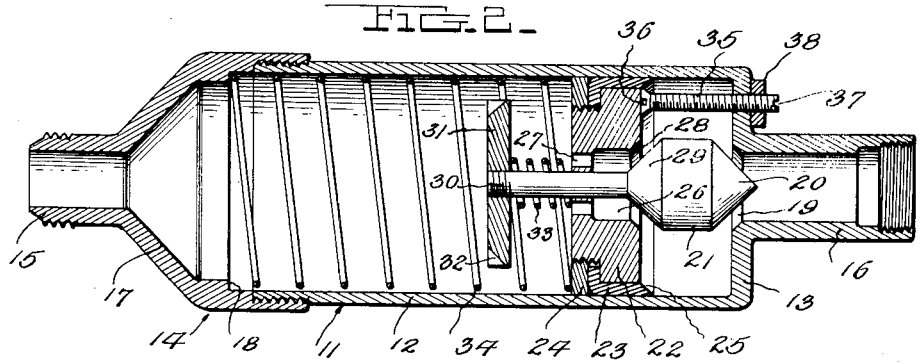
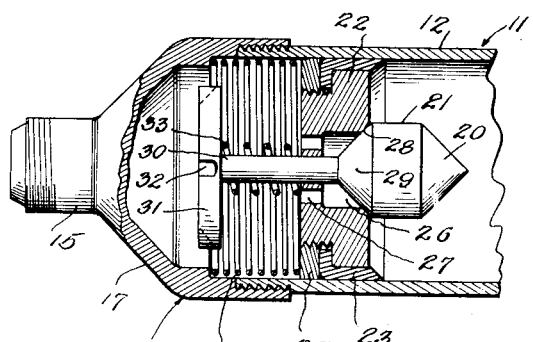
Inventor
E. H. Lund.
Witness
J. R. Pierce
By H. B. Willson & Co.
Attorneys Aug. 13, 1929.  E. H. LUND  1,724,881
SAFETY CUT-OFF FOR PRESSURE LINES OF HYDRAULIC BRAKES
Filed Sept. 12, 1927   2 Sheets-Sheet 2
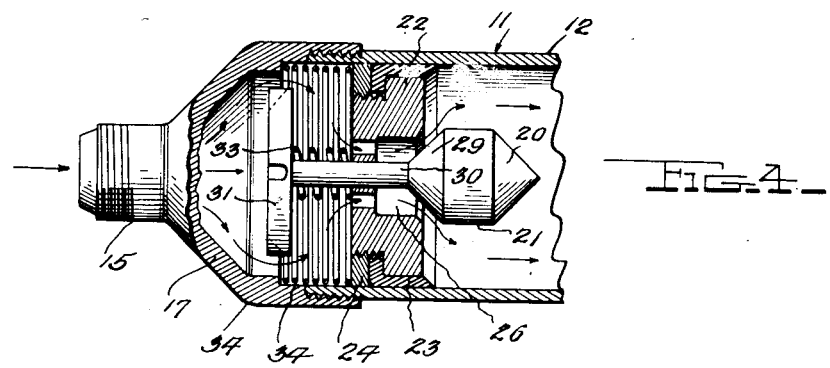
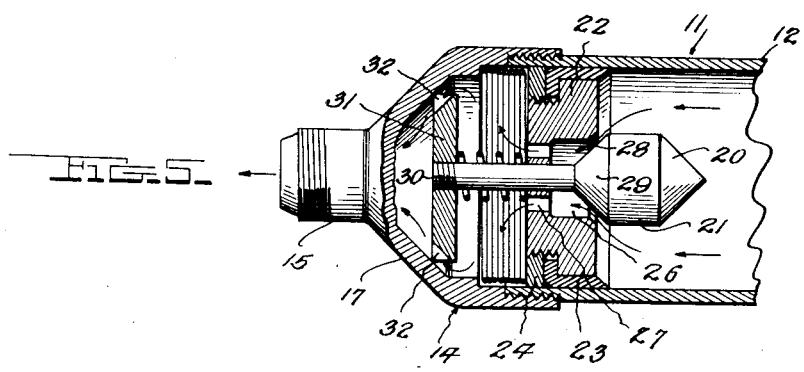
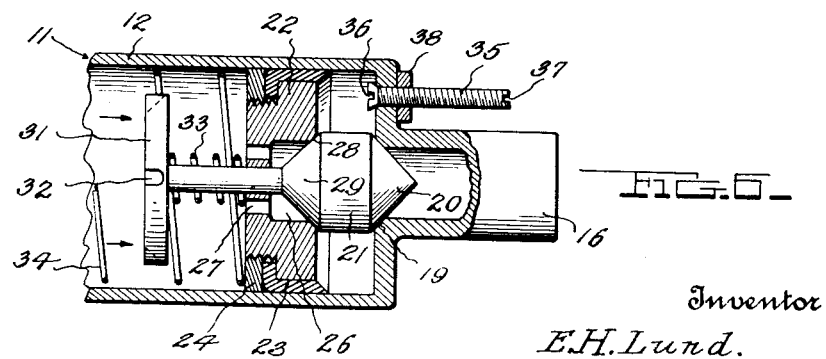
Inventor
E. H. Lund.

Patented Aug. 13, 1929.

1,724,881

UNITED STATES PATENT OFFICE.

EDWIN H. LUND, OF GREAT FALLS, MONTANA, ASSIGNOR OF TWENTY-FIVE PER CENT TO R. E. CROWLEY, OF GREAT FALLS, MONTANA.

SAFETY CUT-OFF FOR PRESSURE LINES OF HYDRAULIC BRAKES.

Application filed September 12, 1927. Serial No. 219,084.

Automobiles using hydraulic brake systems are provided with a pedal-operated piston within a master cylinder, which cylinder is connected by pressure lines with the brakes on the wheels, all four wheels being usually provided with such brakes. The brakes embody drums, brake shoes, cylinder and piston assemblies operated by the liquid from the pressure lines, and power multiplying means between said cylinder and piston assemblies and the brake shoes. The entire system including the master cylinder, the brake drum cylinders and the pressure lines, is filled with liquid and all air must be excluded to prevent the system from becoming "air-bound" and either totally or partially inoperative.

When the foot pedal is depressed, the piston in the master cylinder expels the liquid from the latter through the pressure line and this liquid acts with equal force upon all of the cylinder and piston assemblies of the brakes, thus applying the shoes and when the pedal is released, the brake pistons are retracted by springs and the liquid is forced back through the pressure lines to the master cylinder, and normally there is no pressure in the system with consequent danger of the cup rings or washers on the brake pistons, becoming more or less contracted and permitting air to enter the system, causing it to become air-bound, with danger of disastrous results. It is one object of the invention to provide novel means whereby the liquid between the brake pistons and the device in which my invention is embodied, is constantly held under pressure, thus preventing contraction of the cup rings of the brake pistons and incidentally preventing contraction of a cup ring which is used in the construction of the safety device, thus preventing entrance of air into the portion of the system between the wheel brake cylinders and the safety device and hence preventing the system from becoming air-bound.

Should a leak occur in any of the pressure lines, the liquid drains out and the entire system is rendered inoperative, as upon depression of the pedal the remaining liquid will necessarily take the course of least resistance and will discharge through the leak instead of effecting brake application. Hence, it is another object of my invention to provide new and improved means for automatically closing any of the pressure lines in which a leak may occur, so that only an infinitesimal amount of liquid will be wasted and the brake system will not be rendered inoperative with regard to any wheel except that in connection with whose pressure line, the leak exists.

With the foregoing in view, the invention resides in the novel subject matter hereinafter described and claimed, the description being made with reference to the accompanying drawing.

Fig. 1 is a diagrammatic view showing the application of the invention to a four wheel hydraulic brake system.

Fig. 2 is a central longitudinal sectional view through one of the safety cut off devices, showing the relation of parts when the system is being initially filled with oil or other liquid or is being replenished with liquid after a leak has been repaired.

Figs. 3, 4, 5 and 6 are fragmentary sectional views showing different positions of parts to be hereinafter described.

The numerals 7 on the drawings, denote hydraulic brakes having the usual cylinder and piston assemblies and other features hereinbefore mentioned. Leading to these assemblies, are the usual pressure lines 8 operatively connected with a master cylinder 9 whose piston is operated by the usual foot pedal 10. Introduced into each pressure line 8 at any desired point, is one of the improved safety devices 11. These lines usually consist of piping from the master cylinder to points near the wheels of the machine, but are formed of flexible hose from these points to the wheels, permitting necessary movements of the latter. By preference, the devices 11 are introduced between the piping and the hose portions of the pressure lines and obviously they may be anchored to the chassis frame in any desired manner.

All of the safety devices 11 are of identical construction and hence a specific description of one will suffice. Moreover, although the description given will relate only to the particular embodiment of the invention herein disclosed, it is to be understood that within the scope of such invention as claimed, numerous variations may be made.

I employ a cylinder 12 preferably closed permanently at one end as denoted at 13, but provided at its other end with a threaded cap 14. This cap is formed with a liquid inlet 15 for connection with the portion of the line 8 toward the master cylinder 9, while the cylinder end 13 is provided with a liquid outlet 16 for connection with the portion of the pressure line toward the brake. For a purpose to appear, the outer portion of the cap 14 is substantially frusto-conical as denoted at 17 and spaced inwardly from this portion, is an inwardly facing continuous shoulder 18.

At the inner end of the liquid outlet 16, an inwardly facing valve seat 19 is provided for coaction with one valve face 20 of a valve body 21 to be hereinafter more fully described. This valve body is movably carried by a piston 22 in the cylinder 12, which piston will be defined as a floating piston, in view of the fact that it is free of piston rods or other extraneous operating means. Piston 22 embodies a cup ring 23 of leather or the like held removably in place by a nut 24 and having a feather edge 25 facing the liquid outlet end of the cylinder 12. The nut 24 engages the cylinder wall and forms a sliding guide for the piston 22. Formed in this piston 22 is a liquid passage which leads from one end of said piston to the other, said passage preferably consisting of a recess 26 opening thru the front end of said piston, that is the end facing the cylinder end 13, and ports 27 from said recess to the rear end of the piston. The open end of the recess 26 is formed with a valve seat 28 facing the cylinder end 13 and cooperable with a second face 29 on the valve body 21. This valve body is provided with a carrying stem 30 which passes slidably through a central opening in the piston 22. Suitably secured upon this stem, between the cap 14 and the piston 22, is a disk 31 having a plurality of peripheral ports 32 for a purpose to appear, and at this point, attention may be invited to the fact that these ports do not open thru the side of the disk toward the piston 22. A light coiled spring 33 surrounds the stem 30 between the disk 31 and the piston 22, tending to close the valve face 29 against the seat 28, and a light coiled spring 34 is disposed in the cylinder, between the shoulder 18 and the piston, to constantly urge the piston and parts carried thereby, toward the outlet end 13 of the cylinder 12.

A screw 35 is threaded thru the cylinder end 13 with its head disposed within the cylinder and formed with a kerf 36, while an additional kerf 37 is formed in the outer end of said screw. 38 denotes a lock-nut for this screw when it is backed out to the position of Fig. 6. This screw is instrumental in holding the piston in the position of Fig. 2, when initially filling the brake system with liquid. After such filling, the screw is moved to the position shown in Fig. 6 and the lock-nut 38 tightened, so that the head of the screw and said lock nut effectively prevent any leakage of oil or other liquid which may be used. The kerf 36 is instrumental when initially inserting the screw from the inside of the cylinder and obviously the kerf 37 is employed when moving said screw from one position to another, incident to installation of the safety device.

Fig. 2 of the drawings shows the safety device during installation, the screw 35 being then turned inwardly to hold the piston and valve assembly away from the seat 19. The bleed valves for the brakes are opened and liquid is forced into the pressure lines and through the safety devices 11 by a few applications of the foot pedal or the usual reservoir pump. This action fills the entire system with liquid and all air is driven out, after which the bleed valves are closed. Pressure is now applied several times to the brake pedal to insure passage of liquid through the pressure lines and the safety devices and to make certain that effective brake application takes place. Now, when the foot pedal is released, the usual springs of the cylinder and piston assemblies of the brakes, force the pistons of said assemblies toward retracted positions and during such forcing, the liquid is forced against the piston and valve assembly of the safety device 11. Spring 33 then closes the seat 29 of the valve body 21 against the seat 28 and as the cup washer 23 prevents any liquid passing the piston, this piston and the valve means carried thereby, are forced to the inlet end of the cylinder 12, usually stopping in about the position shown in Fig. 3. During movement to this position, the spring 34 is compressed and hence it exerts a constant force on the piston 22, tending to move it toward the cylinder end 13. The result is that pressure is placed on the liquid between the piston and the cylinder and piston assembly of the brake, and this pressure not only holds the cup ring 23 expanded tightly against the cylinder wall, but similarly holds the cup rings of the brake pistons, so that there is no danger of these rings contracting and permitting any air to enter the system. It is of course understood that the spring 34 is of less strength than the usual springs of the cylinder and piston assemblies of the brakes, so that while it urges the piston 22 toward the end 13 of the cylinder, it cannot of its own accord so move said piston when there is no leak.

Should, as frequently happens, the cylinders of the brakes require more liquid than the volume of the safety device 11 and the return movement of the brake pistons be such as to require that liquid pass the piston 22 to insure full release of the brake shoes, then the relation of parts shown in Fig. 5 exists. From this view, it will be seen that the piston 22 has been forced further than in Fig. 3 and that during such forcing, the disk 31 has come in contact with the frusto-conical portion 17 of the cylinder cap 14. Hence, the movement of the valve parts 31—30—21 has been limited, but the liquid pressure against the piston 22 has moved it sufficiently to move the seat 28 away from valve face 29, thus permitting liquid to pass as shown by the arrows in Fig. 5. After all return of liquid has taken place, spring 34 comes into play to move the piston 22 toward the cylinder end 13, until seat 28 contacts with valve face 29, whereupon this movement is arrested and the cup rings are again subjected to the liquid pressure as above described.

When the pedal 10 is depressed to apply the brakes, liquid is forced from the master cylinder into the cylinder 12 and strikes first upon the disk 31 and then upon the piston 22, and this liquid meets the back pressure of the liquid trapped between the piston 22 and the pistons of the brakes. Hence, the valve body 21 offers much less resistance than said back pressure and it is consequently forced to the open position of Fig. 4, permitting the liquid to flow on thru the pressure line as indicated by the arrows to effect brake application.

Should a leak develop anywhere between the safety device 11 and the associated brake, the back pressure above referred to, will be immediately released, with the result that spring 34 then comes into play to force the entire piston and valve assembly to the outlet end 13 of the cylinder 12, as shown in Fig. 6. Thus, the valve face 20 engages the seat 19 and face 29 contacts with seat 28, as shown in this view. Hence, it is impossible for liquid to pass from the cylinder 12 on into the leaking portion of the pressure line. The result is that although the brake whose pressure line is leaking, will not operate, the remaining brakes will still be in operative condition and may be used until the leak can be repaired. Upon making such repair and replenishing the supply of liquid in the system, the screw 35 is again used, but after initial installation of the safety device and after rectifying any leaks later, this screw is retracted and locked in the position of Fig. 6.

I claim:

1. A safety cut off for a pressure line of a hydraulic brake, comprising a cylinder having a liquid inlet at one end and a liquid outlet at its other end, a floating piston slidable in said cylinder and having a liquid passage from one end to the other, valve means for said liquid passage carried by said piston and closable toward said liquid inlet, and valve means carried by said piston for closing said liquid outlet upon movement of the piston to the outlet end of the cylinder.

2. A safety cut off for a pressure line of a hydraulic brake, comprising a cylinder having a liquid inlet at one end and a liquid outlet at its other end, a floating piston slidable in said cylinder and having a liquid passage from one end to the other, valve means for said liquid passage carried by said piston and closable toward said liquid inlet, valve means carried by said piston for closing said liquid outlet upon movement of the piston to the outlet end of the cylinder, and spring means tending to force said piston toward said outlet end of the cylinder.

3. A safety cut off for a pressure line of a hydraulic brake, comprising a cylinder having a liquid inlet at one end and a liquid outlet at its other end, a floating piston slidable in said cylinder and having a liquid passage from one end to the other, and a two-faced valve carried by said piston, one face of said valve being active to close said liquid passage upon predetermined relative movement of the piston and valve, the other face of said valve being adapted to close said liquid outlet upon movement of the piston and valve bodily to the outlet end of the cylinder.

4. A safety cut off for a pressure line of a hydraulic brake, comprising a cylinder having a liquid inlet at one end and a liquid outlet at its other end, a floating piston slidable in said cylinder and having a liquid passage from one end to the other, a two-faced valve carried by said piston, one face of said valve being active to close said liquid passage upon predetermined relative movement of the piston and valve, the other face of said valve being adapted to close said liquid outlet upon movement of the piston and valve bodily to the outlet end of the cylinder, and spring means tending to force said piston toward said outlet end of the cylinder.

5. A safety cut off for a pressure line of a hydraulic brake, comprising a cylinder having a liquid inlet at one end and a liquid outlet at its other end, a floating piston slidable in said cylinder and having a liquid passage from one end to the other, and a valve body between said piston and the outlet end of the cylinder and having a stem passing slidably through said piston, said valve body having one face toward the piston for closing said liquid passage and another face toward said outlet end of the cylinder to close said liquid outlet upon movement of the piston and valve to said outlet end of the cylinder.

6. A safety cut off for a pressure line of a hydraulic brake, comprising a cylinder having having a liquid inlet at one end and a liquid outlet at its other end, a floating piston slidable in said cylinder and having a liquid passage from one end to the other, a valve body between said piston and the outlet end of the cylinder and having a stem passing slidably through said piston, said valve body having one face toward the piston for closing said liquid passage and another face toward said outlet end of the cylinder to close said liquid outlet upon movement of the piston and valve to said outlet end of the cylinder, and spring means tending to force said piston toward said outlet end of the cylinder.

7. A safety cut off for a pressure line of a hydraulic brake, comprising a cylinder having a liquid inlet at one end and a central liquid outlet at its other end, the inner end of said outlet being formed with an inwardly facing valve seat, a floating piston in said cylinder, having a liquid passage from one end to the other, said passage opening centrally at the end of the piston facing said liquid outlet and at said end having a valve seat facing said liquid outlet, a valve body between the piston and the outlet end of the cylinder and having a stem passing slidably through the piston, said body having oppositely facing valve faces cooperable with said valve seats respectively, spring means acting on said stem and tending to close said valve body against the seat of said liquid passage, and spring means tending to force the piston toward the outlet end of the cylinder.

8. A structure as specified in claim 1; together with means for opening and holding the valve means of said liquid passage open upon excessive movement of the piston toward the inlet end of the cylinder.

9. A structure as specified in claim 5; together with a peripherally ported disk on said stem between the piston and the inlet end of the cylinder, said inlet end of said cylinder having a portion to contact with said disk and unseat said valve body from the seat of said liquid passage upon excessive movement of the piston toward said inlet end of the cylinder.

10. In a safety cut off for a pressure line of a hydraulic brake, a cylinder for introduction into the line, a floating piston in the cylinder having valve means for closing the liquid outlet of the cylinder upon movement of said piston to the outlet end of said cylinder, said piston having a cup ring contacting with the cylinder wall and facing said outlet end of the cylinder, and spring means urging said piston toward said outlet end of the cylinder, whereby said cup ring is constantly subjected to the pressure of the liquid trapped in the portion of the pressure line between said cylinder and the brake, and whereby said spring will force said piston to the outlet end of the cylinder to close the outlet of the latter in case of a leak in said portion of the line.

In testimony whereof I have hereunto affixed my signature.

EDWIN H. LUND.